United States Patent [19]

Kelley

[11] Patent Number: 4,926,171

[45] Date of Patent: May 15, 1990

[54] COLLISION PREDICTING AND AVOIDANCE DEVICE FOR MOVING VEHICLES

[76] Inventor: William L. Kelley, 4633 SW. 31st Dr., Hollywood, Fla. 33023

[21] Appl. No.: 273,919

[22] Filed: Nov. 21, 1988

[51] Int. Cl.$^5$ .............................................. G08G 5/04
[52] U.S. Cl. ...................................... 340/961; 342/29; 364/461
[58] Field of Search ............... 340/961, 903, 904, 942, 340/943, 52 H; 342/28, 29, 70, 71, 139, 455; 364/460, 461

[56] References Cited

U.S. PATENT DOCUMENTS

| | | | |
|---|---|---|---|
| 2,663,518 | 12/1953 | Muffly | 342/29 |
| 3,025,514 | 3/1962 | Alexander et al. | 342/29 |
| 3,150,364 | 9/1964 | Green, V | 340/961 |
| 3,179,939 | 4/1965 | Castellini | 342/29 |
| 3,714,651 | 1/1973 | Lyon | 342/29 |
| 3,757,339 | 9/1973 | Shear et al. | 340/961 |
| 4,349,823 | 9/1982 | Tagami et al. | 340/904 |
| 4,417,248 | 11/1983 | Mathews | 364/461 |
| 4,713,669 | 12/1987 | Shuch | 342/29 |
| 4,809,178 | 2/1989 | Ninomiya et al. | 364/461 |

Primary Examiner—Joseph A. Orsino
Assistant Examiner—Brent A. Swarthout
Attorney, Agent, or Firm—Herbert L. Lerner; Laurence A. Greenberg

[57] ABSTRACT

Apparatus for avoiding collision between a vehicle and an object that moves in a trajectory relative to the vehicle. The apparatus includes at least one microwave pulsed transmitter and receiver for transmitting a scanning beam of pulsed energy which scans a sector of space, at least forward of the vehicle, a check for producing timing pulses, a ranging device connected to the clock and the receiver for measuring the time difference between the transmitted pulses and any echoes received by the receiver. The antenna is pivotally coupled to the vehicle and a scanning motor serves to set the antenna in a scanning motion. A direction device is coupled to the scanning antenna for sensing the direction of the antenna. A computer is connected to ranging device, the clock, the direction device and computes continuously the last three coordinated for vector to the object, and is connected to an anunciator which can speak and/or display a message to the vehicle operator.

12 Claims, 9 Drawing Sheets

COLLISION PREDICTING AND AVOIDANCE DEVICE FOR MOVING VEHICLES

BACKGROUND OF THE INVENTION:

1. Field of the Invention:

The invention relates to apparatus for detecting objects that may pose a collision hazard to or interfere with a moving vehicle, and for providing means for redirecting the vehicle to avoid engagement with such objects.

In the instant disclosure the term "vehicle" includes any conveyance, for transporting anything including persons or load in or on any medium, including in air, on land, on sea, in water or in airless space outside the earth's atmosphere. The term "objects" includes anything, whether moving or stationary that may interfere with the vehicle if an engagement with the object is encountered. The term "object" includes solid stationary or moving objects, atmospheric conditions, such as air turbulence, precipitation, fog, smoke, or the like, that are detectable by a radiated beam of energy.

2. Description of the Related Art:

It is well known to equip a vehicle e.g. an aircraft or a ship with devices, such as radar that projects in a defined direction a pulsed scanning beam of electromagnetic energy of short wavelength that is capable of returning a detectable echo from an object being hit by the beam, and to provide means for measuring the time elapsed from the moment a pulse is sent out until it's echo returns and to compute the distance and direction to the object, based on the elapsed time and the known velocity of propagation of the pulse, and to generate a warning signal in case an object is detected which may pose a collision or other hazard.

Such prior art devices, however, have the drawback that avoidance of a collision is left to the human operator controlling the course of the vehicle, based on inputs from the radar. Devices are also known that react to a radar echo to activate, for example, an alarm or the brakes of a vehicle, such that an impending collision with an object can be avoided or mitigated.

The devices of the known art, however, have several drawbacks. For one thing, if the trajectory of the vehicle is curved and/or if the vehicle and the object each have complex curved trajectories, it is very difficult for a human operator to determine if a collision is probable and to devise a proper evasive reaction, using human judgment and intuition.

The instant invention overcomes this problem by devising apparatus for mounting on a vehicle, using relatively simple algorithms, that can determine if an impact with one or more objects is imminent and is capable of providing early warning and/or defining evasive counter action without the need for highly sophisticated computing apparatus.

SUMMARY OF THE INVENTION

In the most general form of the invention, the moving vehicle has mounted thereon beam-transmitting means for projecting a beam that either scans an entire sector area ahead of the vehicle, or has multiple beam transmitters that individually scan limited sector areas from the vehicle, or the moving vehicle may have a multiplicity of fixed beam transmitters that are scanned individually by scan control apparatus.

The transmitted beam is of a type that is capable of returning a detectable echo from the object. Beams of such type are advantageously of the type known as centimeter microwaves, typically in the range from 3 giga Hz to 30 giga Hz, i.e. wavelengths from 1 cm to 0.1 cm. Other types of beams being usable are infra-red beams and beams of laser light that are also capable of being transmitted as a beam in a defined direction and returning an echo from a target. In an especially advantageous embodiment of the invention, a road-faring, sea-faring or rail-faring vehicle, such as an automobile, ship or train, has at its front end, mounted e.g. on a front bumper, a microwave transmitter that transmits a horizontally scanning beam of pulsed microwave energy combined with a microwave receiver tuned to the same microwave wavelength. Upon encountering an echo from one or more objects within the range of the scanning beam a ranging device coupled to the transmitter and receiver, determines at a given repetition rate the direction and range to the object or to each object, if several objects are detected, in relation to the vehicle and records these data in a respective memory location of a computer connected to the device. The direction and distance to the object (i.e. the "vector") from at least two consecutive scans provide means for determining by extrapolation an estimated projection of the trajectory of the object, relative to the vehicle. It can be shown that three or more points of the relative trajectory that is continuously being updated so that at all times only the last three vectors are used, provide a good approximation of the trajectory. It follows that three points define uniquely a circular approximation to the trajectory, and that the probability of a collision with the object can be determined with a reasonably good accuracy, and that relatively simple computations are required for computing this probability.

Four or more points clearly provide an even better prediction but require more complex computation.

It can also be shown that by recording the precise time of receipt of the echo, not only can the probability of the impact but also the probable time of the impact be computed.

It can also be shown that by continuously using the latest arriving three echoes for the computation of the trajectory, the accuracy of the computed predicted trajectory becomes better and better, using successive computations as the distance to the object becomes shorter, until either no collision takes place or a collision is imminent.

It can also be shown that by computing the probability and probable time of impact, it is possible to couple the computed predicted estimated time of impact to the vehicle's motion control elements through decision-making devices, such that a collision can be averted, e.g. by slowing the vehicle down, or taking another direction of movement by turning the vehicle away from the probable point of impact.

It is accordingly the object of the invention to provide apparatus connected with a vehicle that repeatedly determines the distance and direction of an object relative to a vehicle and computes the probable point and time of impact, and to further provide instructions or suggestions for evasive action. The evasive action may be simply changing velocity or braking the vehicle, or simply changing its direction, or a combination of such actions, for the greatest effectiveness of evasive action. Also, in case of changing course of the vehicle, the most effective course change can be determined, i.e. left or right.

In a preferred embodiment, the invention includes apparatus to be mounted on a vehicle, and has means for transmitting a pulsed scanning beam to an area forward of the vehicle, means for receiving successive echoes from an object within a range of the beam, means for determining from the echoes the range and direction to the object in successive scans, means for repeatedly computing on the basis of the repeated range and direction information the estimated trajectory of the object relative to the vehicle and means for predicting the probability and time of a collision and means for evading the point of collision.

According to an additional feature of the invention, the three latest echoes are used for repeatedly computing the probability of impact with the object.

According to an added feature of the invention, the time of arrival of each of the three latest echoes is recorded as well as the range and direction to the object, and computing the probable time of a probable impact.

According to again another feature of the invention, relative estimated trajectories are computed for several objects for which echoes are received, and means are provided for computing the most suitable evasive action or combination of actions.

According to again an additional feature of the invention, the invention is applicable also to vehicles moving in three- dimensions such as aircraft and submarines. In the latter cases, the scanning beam must be scanning inside a conical space from the vehicle. In the case of submarines, the scanning beam is advantageously a beam of sound energy, since electromagnetic energy has limited penetration under water.

In the case of aircraft, the scanning beam is advantageously of microwave energy in the narrow frequency ranges capable of reflecting wind shear or turbulence in the air, e.g. by means of the random doppler effect detectable in the reflected echo.

In accordance with still another feature, the invention contemplates the placement of reflecting markers, placed advantageously on posts placed spaced apart along the roadside, on bridge abutments, waterways, utility poles and so forth, allowing reflections even above a layer of snow, reflecting markers placed on the rear and other sides of other vehicles, and reflecting markers placed in the road surface.

In accordance with still an additional feature of the invention, vehicles having the invention installed may have servo actuators controlled by the trajectory computing and evasion avoidance logic apparatus, which in turn engage the vehicle's steering and/or braking apparatus in order to implement an evasive action, or a combinations of actions.

In a similar manner, it is contemplated that aircraft having the invention installed have servo actuators responsive to the computing apparatus for engaging the aircraft controls in order to automatically perform the required evasive actions.

Other features which are considered as characteristic for the invention are set forth in the appended claims.

Although the invention is illustrated and described herein as embodied in a collision predicting and avoidance device for moving vehicles, it is nevertheless not intended to be limited to the details shown, since various modifications and structural changes may be made therein without departing from the spirit of the invention and within the scope and range of equivalents of the claims.

BRIEF DESCRIPTION OF THE DRAWING:

The construction and method of operation of the invention, however, together with additional objects and advantages thereof will be best understood from the following description of specific embodiments when read in connection with the accompanying drawings, in which.

Figure 3:
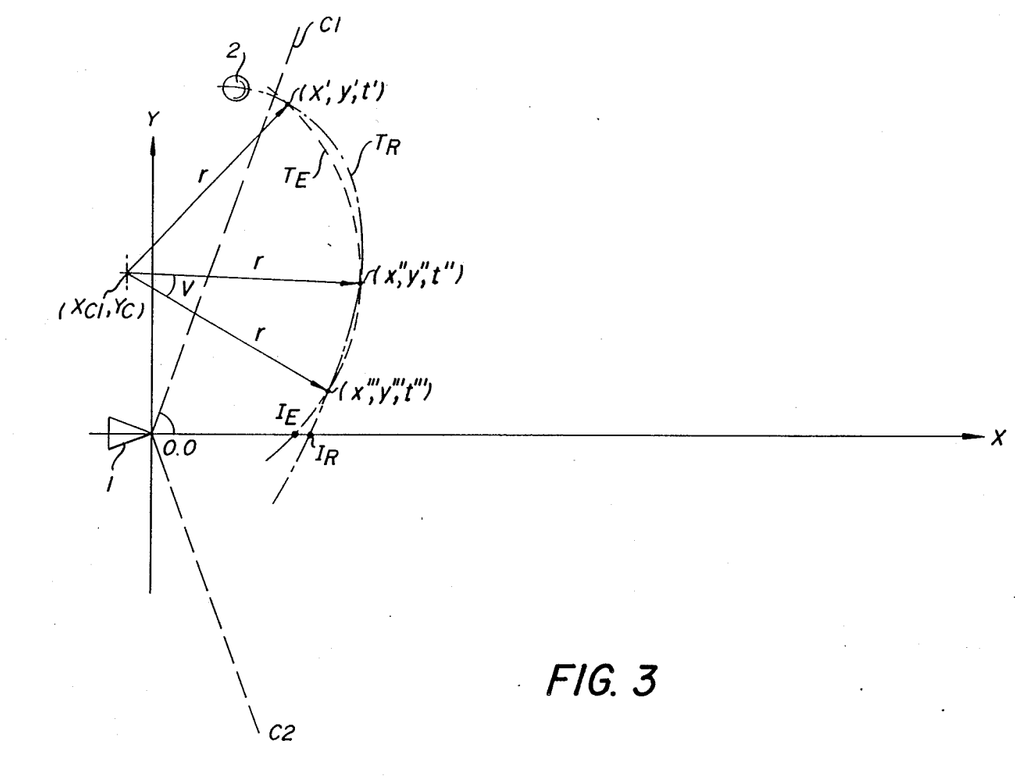
FIG. 3 is a diagram supporting the description of the control algorithm for the invention.

DESCRIPTION OF THE PREFERRED EMBODIMENTS:

FIG. 3 illustrates the underlying principle of the invention. The vehicle 1 is moving in a plane defined by a moving cartesian coordinate system x, y having its starting coordinates 0, 0 at the nose of the vehicle, and wherein the x-axis is coextensive of the axis of the vehicle and defines the vehicle's motion in the coordinate system x, y. A radar 3 in the nose of the vehicle scans a sector defined by lines C1 and C2 intersecting each other at the nose of the vehicle, which has coordinates (0,0). An object 2 moves in a relative trajectory $T_R$ to the vehicle. The radar 3 has determined the last three relative coordinates x, y and t, of the object wherein t is the time the object was determined to be at coordinates x, y, in relation to the vehicle, for three points of the relative trajectory $T_R$. The last three points are identified as having respective coordinates in space and time as (x', y', t'), (X", y", t") and (x''', y''', t'''). The vehicle computer can, now by a relatively simple computation, define an estimated relative trajectory $T_E$ using the last three coordinates for determining an approximating circle $T_E$ which intersects the aforesaid three last coordinates. The circle $T_E$ has center coordinates ($x_c$, $y_c$) and radius r. The object is to determine if there is a probability of collision between the vehicle 1 and the object 2, and if affirmative, to determine the estimated time of collision.

Referring to FIG. 3, the parameters defining a circle $T_E$ are the coordinates $x_c$, $y_c$ of the center of the circle and its radius r. The circle is defined by the equation:

$$(x-x_c)^2+(y-y_c)^2=r^2; \tag{1}$$

The equation (1) must be satisfied in the last three scanning points (x, y, t), which gives:

$$(x'-x_c)^2+(y'-y_c)^2=r^2$$
$$(x''-x_c)^2+(y''-y_c)^2=r^2 \quad (2)$$
$$(x'''-x_c)^2+(y'''-y_c)^2$$

The equations (2) have three unknown variables, namely $x_c$, $y_c$ and r, while the known variables are x', y'; x", y"; and x'", y'". The equations (2) can, therefore, readily be solved by the vehicle computer for the unknown variables $x_c$, $y_c$ and r, using well known mathematical techniques.

The circle now being defined may intersect the x-axis at a point $I_E$ which is the estimated point of impact. If the point $I_E$ intersects the x-axis within the perimeter of the vehicle, there is clearly a probability of impact equal to 1.

The estimated time $t_I$ of impact can now readily be computed, using the assumption that the relative velocity of the object between time t'" and $t_I$ is constant and equal to the average value of the velocity of the object between times t" and t'". Assuming the angle v between the radii to points (x", y") and x'", y'") is small, the distance between these points is equal to $(x'''-x'')^2+(y'''-y'')^2$, and the average velocity $V_A$ is equal to:

$$V_A=((x'''=x'')^2+(y'''-y'')^2)^{1/2}/ (t'''-t'') \quad (3)$$

The estimated abscissa $X_{IE}$ of the point of impact $I_E$ can be determined as the value of x from equation (1) by setting y=0:

$$X_{IE} = \sqrt{r^2 - y_c^2} + x_c \quad (4)$$

The distance D between points $I_E$ and (x, y'") can be determined as:

$$D = \sqrt{((x''' - X_{IE})^2 + y'''^2} \quad (5)$$

and the estimated time $t_I$ of impact can be determined as the time t'" plus the time for traversing the distance D, which gives, from equations (3) and (5)

$$t_I=t'''+D/V_A \quad (6).$$

Greater accuracy, if desired, in the estimates can be obtained by taking into account the derivatives of the relative time lapse between points (x', y'), (x", y") and (x'", y'"), using well known methods from the mathematical sciences, such as Taylor's theorem, well known to engineers (see for example "Advanced Engineering Mathematics" by Wylie, published by McGraw-Hill, 1951).

In case several echoes, each representing an object, are encountered in each scan, the coordinates for each echo must be stored in a separate file, each labeled with a label e.g. a number representing that object. In order to keep the objects' coordinates separated in their proper files, it is necessary, whenever an echo for an object is first detected to assign to it the label that determines which file it is to be assigned to and to compute its estimated next coordinates at the time of the next scan. At the next scan, the identity of the object is determined as the object being closest to the estimated next coordinates. After each object has been labelled and three sets of coordinates determined for that object, the object is firmly "located" in its appropriate file. In case a scan produces one object of several, that falls widely apart from its estimated position, the coordinates thus determined will be disregarded as being irrelevant.

Figure 2A:
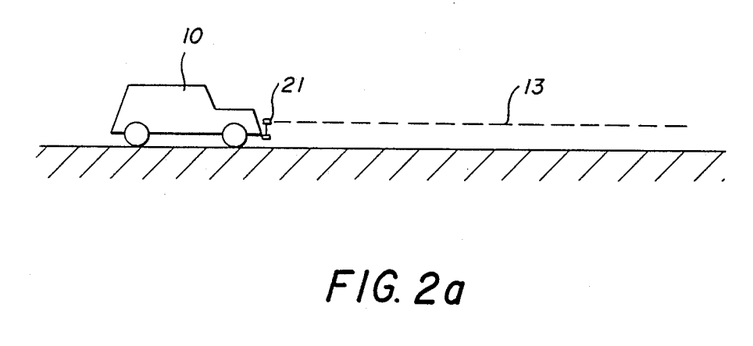
FIGS. 2a and 2b are respective, diagrammatic, elevational and plan views of a vehicle moving on a curved road surface.
Figure 2B:
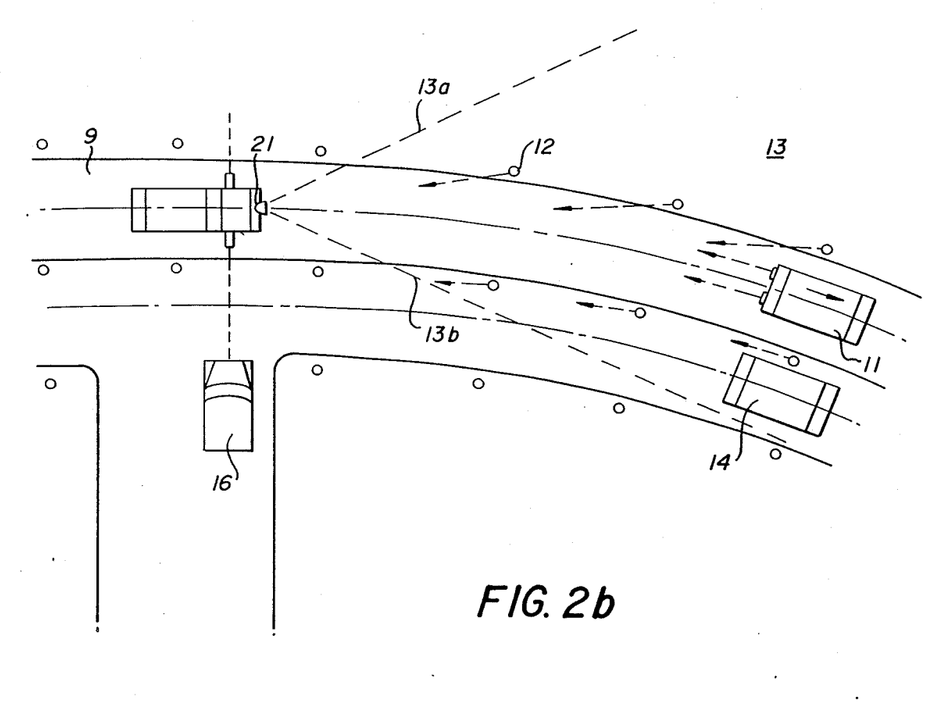

Using the aforesaid method of estimating the relative trajectory and probability of impact with a moving object, it is possible to construct and operate a vehicle collision avoidance apparatus that disregards other objects such as vehicles moving in the opposite direction on a road, and stationary objects such as trees and road markers 12, along the roadside, seen in FIG. 2a, even when the vehicle travels along a curved track, and also other vehicles 11 moving in parallel tracks with the vehicle 10, and vehicles 14 moving in opposite direction.

It follows that the principle underlying the invention can be extended to the three-dimensional space (x, y, z) and as a logical extension thereof, to the four-dimensional continuum (x, y, z, t) wherein it would apply to aircraft, including space craft, missiles and the like.

It also follows that the invention can readily be extended to include a feature for collision avoidance by the addition of logic and apparatus included in the vehicle and coupled to the vehicle for modifying its trajectory, as described in more detail in the following sections of the instant disclosure.

Figure 4:
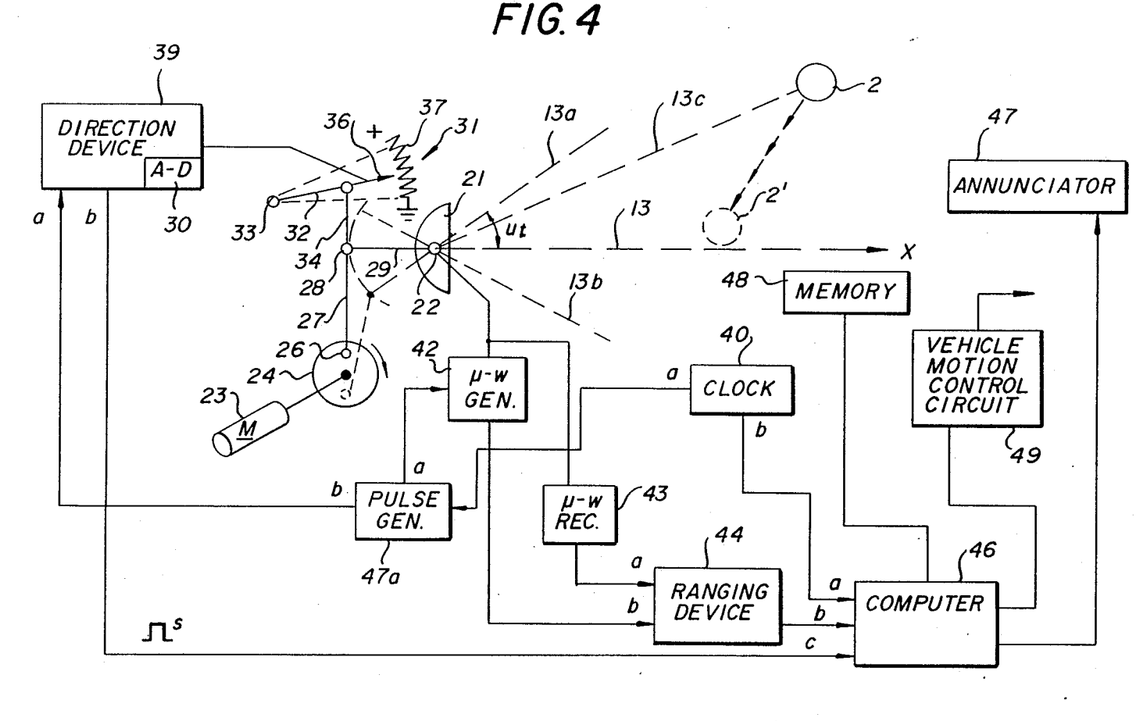
FIG. 4 is a block diagram of the invention.

FIG. 4 shows in block diagram form the main elements of the invention as typically installed in a ground-based vehicle. An energy transmitter-receiver 22, advantageously in the form of a pulsed centimeter wave transmitter-receiver antenna 22 mounted in the focal point of a parabolic reflector 21, is pivotable about a vertical axis through its focal point, driven in a scanning motion by a motor 23 turning a wheel 24 having a tap 26 thereon. The tap 26 is pivotally connected at one end to a connecting link 27, in turn connected pivotably at the other end to the distal end 28 of a toggle lever 29 which is rigidly attached to the reflector 21, which as a result oscillates about an axis through its focal point, thereby causing the pulsed beam 13 to oscillate back and forth between its extreme positions 13a and 13b. In order to determine the instantaneous position of the oscillating beam 13, the distal end of the toggle lever 29 is connected to a potentiometer arm 32, of a positon-sensing potentiometer 31, which toggles back and forth with its contact point 36 on the potentiometer body 37, which is connected between ground and plus potential.

It follows that as the reflector 21 oscillates back and forth, the potential on the potentiometer contact 36 oscillates about a mean value in a oscillatory movement, approximating a sine wave, which is connected to the direction device 39, including an analog-to-digital converter 30 which continuously converts the analog potential of the potentiometer contact 36 to a digital value e.g. in binary form, representing the position of the beam 13 within its scanning range. It follows that the potentiometer 31 may be a resistive, capacitive or inductive potentiometer, the latter two of which would better overcome any wear problems that might afflict a resistive potentiometer. It also follows that the instantaneous position of the reflector 21 can be determined by other means, such as a narrow light beam reflected from a binary encoded reflecting scale connected to the reflector 21, in well known manner.

The transmitter-receiver antenna 22 is in turn connected to a pulsing microwave generator 42 in well known manner. The microwave generator 42 and the microwave receiver 43 are connected to two inputs a and b of a ranging device 44, which receives a pulse for each pulse transmitted by the beam 13 toward an object 2 coming within the range of the a beam 13c on its input b. When the receiver receives the echo from the object 2 the ranging device 44 receives a short instant later a pulse from the receiver 43 on the input a resulting from the propagation delay. The ranging device determines the time difference between pulses at pins a and b as a time difference dt. This time difference dt represents the distance to the object, when the velocity of the pulse is known, which is nearly $3 \times 10^{10}$ cm/sec.

The microwave generator 42 is controlled by a pulse generator 47, which for each pulse transmitted sends simultaneous synchronizing pulses on pin b of the pulse generator 47 to an input of the direction device, pin a, which in turn transmits in a burst on pin b in digital code the instantaneous position of the beam 13, e.g. in degrees angle from the center position, i.e. the x-axis 13 of the beam. The digital burst representing the position of the beam 13 may consist of a plurality of parallel ones and zeros or can be sent in serial form. A clock 40, driven by the pulse generator 47 provides an advancing clock signal on pin b, again in binary code or the like.

Figure 1:
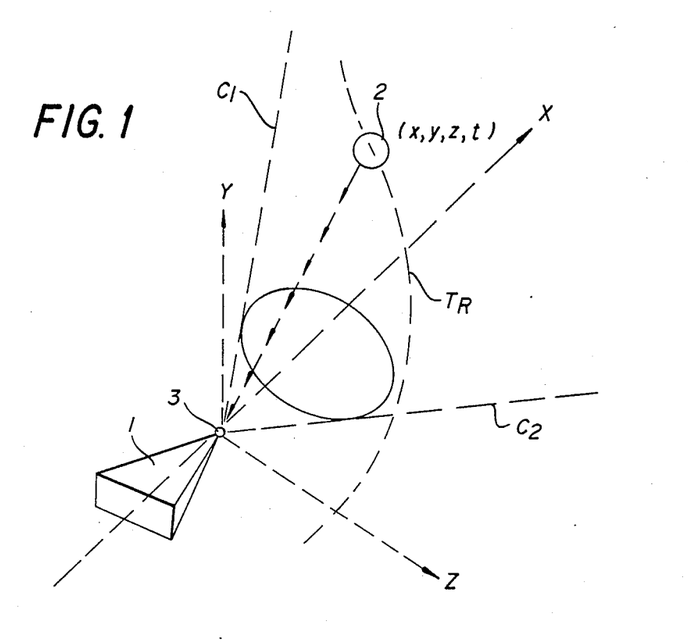
FIG. 1 is a diagrammatic view of a vehicle moving in an x, y, z, t continuum and an object moving in a trajectory relative to the vehicle.

A computer 46 serves to compute the vector to the target 2 as it moves in relation to the vehicle 1. The vector consists of the coordinates x, y, z and t shown in FIG. 1 and described above, if the vehicle is moving in a three-dimensional space, or only x, y and t, if the vehicle is moving in a two- dimensional space such an automobile or a ship.

The computer 46 includes a memory 48 which provides storage for the elements of the invention. The computer is shown in more detail in FIG. 5 connected with a vehicle motion control circuit 49 seen in FIG. 4 via vehicle control interface 62 and an anunciator 47 that serves to inform the vehicle operator of any impending or probable impact, via a speaker 63 and/or a display 64.

Figure 5:
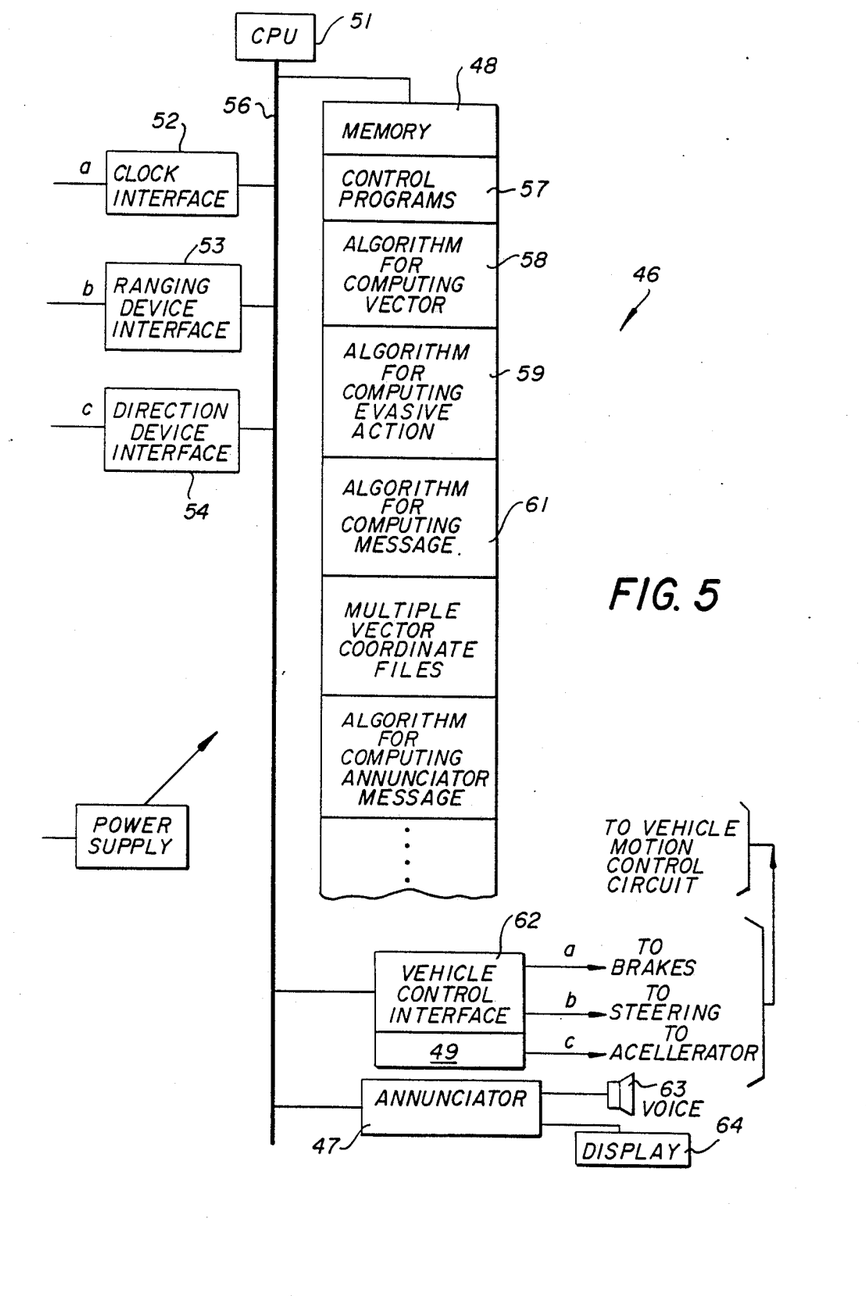
FIG. 5 is a block diagram of the computing apparatus.

FIG. 5 shows further details of the computer 46, such as a central processing unit (CPU) 51, which is connected via a bus 56 to a clock interface 52 which provides the computer 46 with timing pulses from the crystal-controlled clock pulse generator 47a, via lead a. A ranging device interface 53 receives the time difference pulses dt from the ranging device 44 via lead b and a direction device interface 54 which receives the binary encoded beam direction data from the direction device 39 via lead C. The CPU 51 is also connected to a computer memory 48 which has stored therein the control programs for operating the system. The control program is constructed according to a flow chart seen in FIG. 7 as described in more detail below. The memory 48 also contains stored therein the various computing algorithms used to operate the system, including the algorithms 58 for computing the vector to the target or object 2, as described in detail hereinabove in relation to FIG. 3, and an evasion algorithm for computing the evasive action to avoid collision, and a message algorithm for computing a message to the vehicle operator informing him of an impending collision and eventually of recommended action. The anunciator 47 is connected with the speaker 63 and the display 64 showing visually by signals, for example in the way of luminous arrows the recommended evasion action, such as for example, "pull right", "pull left", "brake", for an automobile or a ship, or "pull up" or "pull down" for an aircraft or submarine.

Figure 6A:
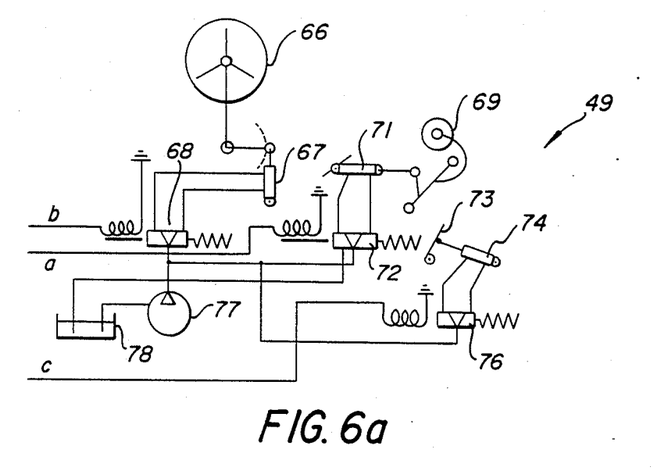
FIG. 6a is a schematic diagram of the hydraulic control apparatus engaging the vehicle's control elements.

FIG. 6a shows the vehicle controls as applied to a road vehicle. Different controls would be required for an aircraft for example, but the principle of operation would be similar. In FIG. 6a lead b from the vehicle control interface 62 controls a hydraulic valve 68 with hydraulic fluid under pressure from a pump 77 connected on the intake side to a fluid reservoir 78 and on the output side to the valve 68. The valve controls a hydraulic cylinder 67 linked to the vehicle steering column and wheel 66. Similarly a lead "a" controls a valve 72 which in turn controls a cylinder 71, linked to the vehicle brake pedal 69 and a lead "c" controls a valve 76, in turn controlling a cylinder 74 linked to the accelerator pedal 73.

In an aircraft the cylinders would be coupled to the rudder, elevators, ailerons and the engine power controls in similar fashion as described above.

Figure 6B:
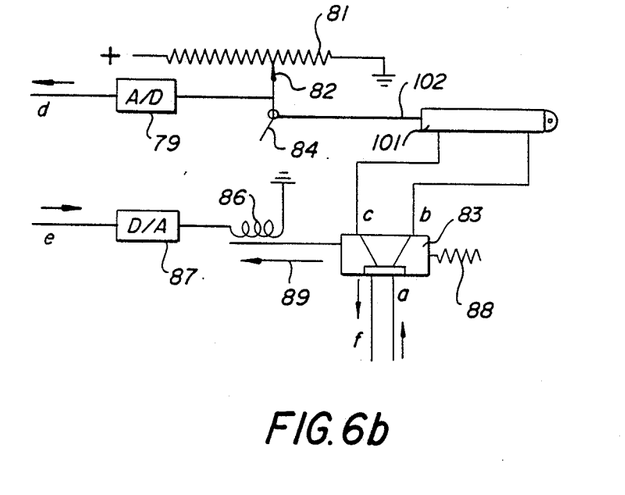
FIG. 6b is a schematic diagram showing further details of the control elements.
Figure 7A:
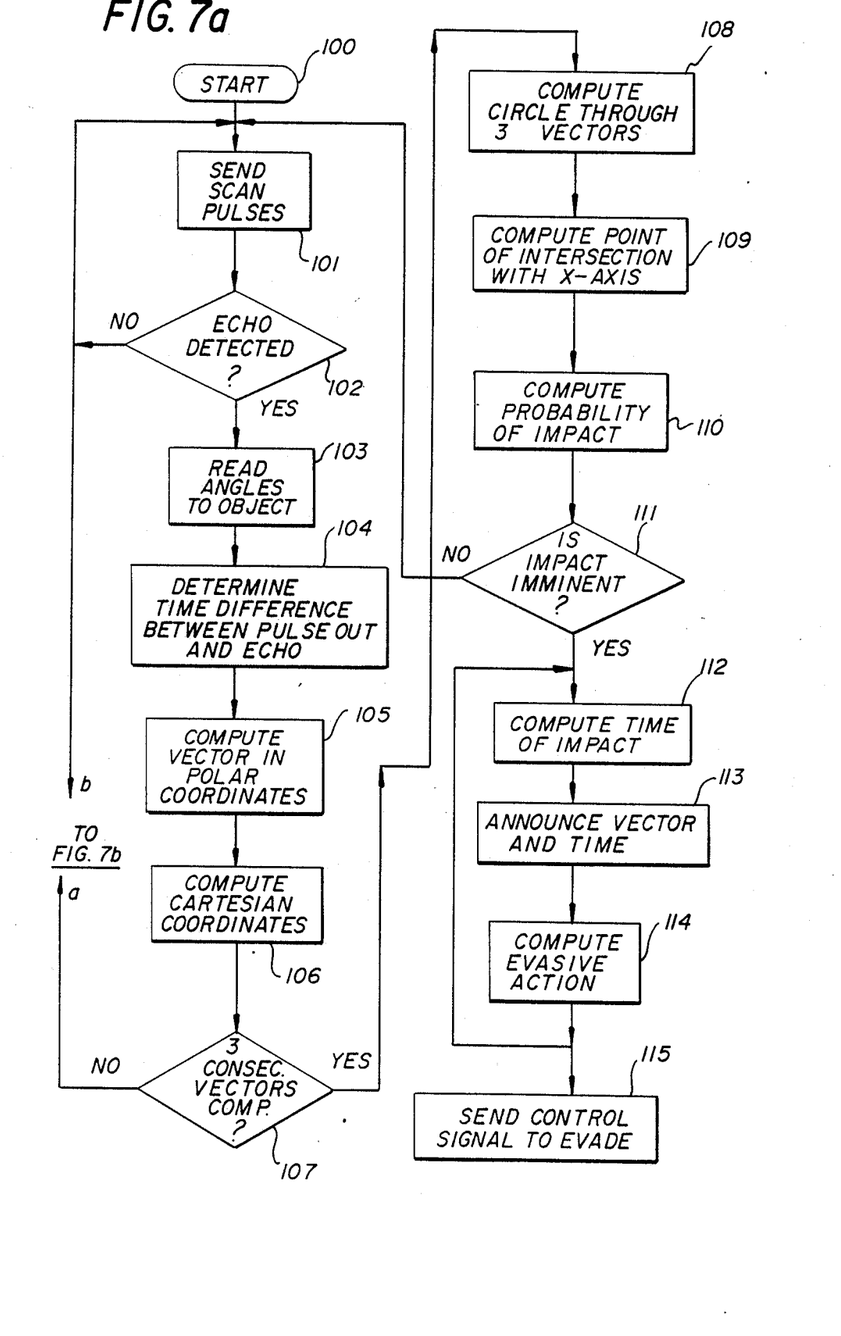
FIG. 7a is a flow chart showing the operation of the invention in step-by-step sequence.
Figure 7B:
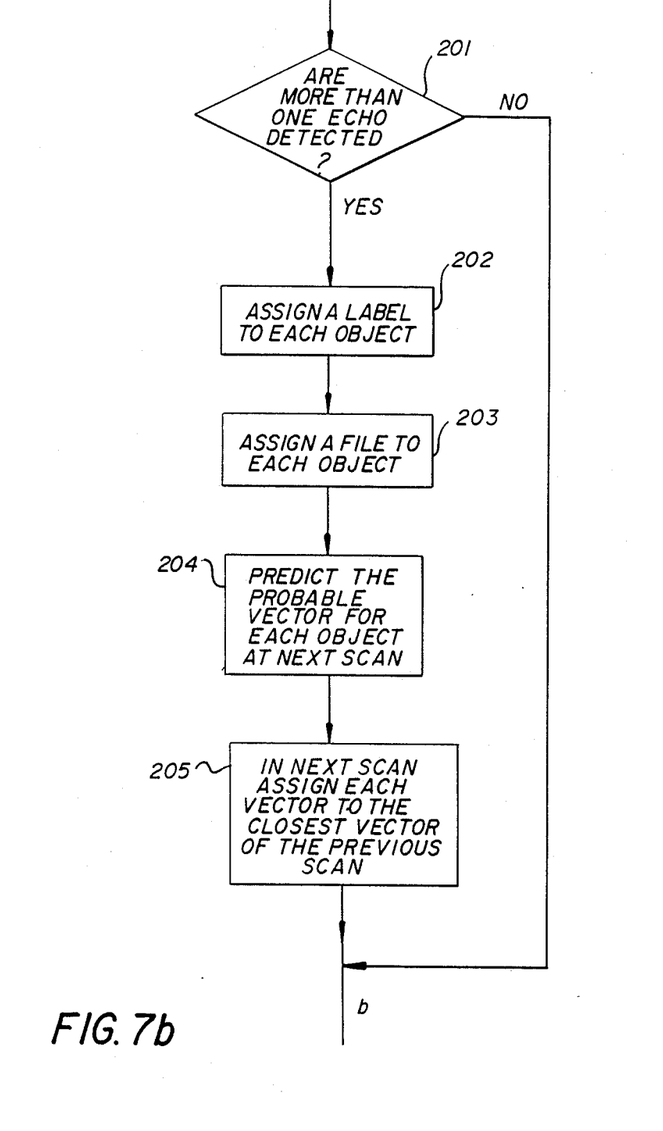
FIG. 7b is a separate program loop for several objects each returning an echo.

FIG. 6b shows additional details of the computer control of a control element. The incoming lead e from the computer receives a signal which is typically a digitally encoded signal which is converted in the digital-/analog converter 87 into a proportional analog control signal connected to the solenoid 86 of the hydraulic control value 83. The control signal pulls the valve spool in direction of the arrow 89 and is counteracted by a spring 88 also attached to the spool in conventional manner. The valve 83 is connected to a source of hydraulic pressure at input a, and distributes the pressure to the opposite ends of the cylinder 101, which applies proportional pressure to the cylinder piston and rod 102, linked to the particular control element to be operated at link 84. A feedback may be provided by a potentiometer 81 connected between +and ground, having its sliding contact 82 connected to an analog-to-digital converter 79 which in turn sends in digital form a feedback to the computer via lead d. The overflow hydraulic fluid is returned to the fluid reservoir 78 via fluid connection f. The flow-chart of FIG. 7a, b shows in step-by-step form the operation of the control system. After start 100, scan pulses in the form of centimeter waves or other pulsed energy are transmitted in the form of a beam scanning the sector from which one or several objects may appear (101). If an echo is detected in decision step 102 the angles of the vector to the object is read in step 103. If no object echo is detected scanning continues in step 101. The time difference between the pulse sent in step 101 and the echo received in step 102 is determined as dt in step 104. The polar coordinates for the vector are determined in step 105 and converted to cartesian coordinates in step 106. Three sets of cartesian coordinates are required as determined in decision step 107, and are used to compute a circle defined by the three sets of coordinates in step 108. FIG. 7a assumes that the operation takes place in a two- or three-dimensional space, but if a three-dimensional space is required four sets of cartesian coordinates would be required in step 107, and a sphere would be computed in step 108. The intersection of the circle (or sphere, if applicable) with the x-axis (i.e. the axis of the vehicle) would be the closest point of proximity of the object to the vehicle as computed in step 109. Taking the tolerances of all the variables into account, the probability of an impact would be computed in step 110, and in case the probability falls within a given range as determined in decision step 111, the probable time of impact will be computed in step 112, and an announcement will be made in step 113, giving the driver or pilot of the vehicle the vector to the object and the probable time of impact. At the same time a computation of the evasive action will be performed and transmitted to the vehicle's control elements, optionally subject to the driver's or pilot's overriding action.

FIG. 7b is a flow chart of the additional steps of handling multiple objects each returning an echo. The chart of FIG. 7b is branched off from FIG. 7a at points a and b between steps 102 and 107.

In FIG. 7b, if decision point 201 determines that several echoes are returned, the operation continues in steps 202-205, but if several echoes are not detected, the procedures of FIG. 7b is bypassed by a direct line from step 201 to exit b.

If multiple echoes are detected each object sending an echo is labelled, for example, with consecutive numbers, and assigned to a file in step 203. In step 204 the probable vector for the object at the next scan is determined. In the next scan, the object having the vector closest to previous one is assigned to the same file, in step 205, and henceforth each object file stores the respective object parameters, which are each used to compute the respective estimated trajectories and probability of impact.

Figure 8A:
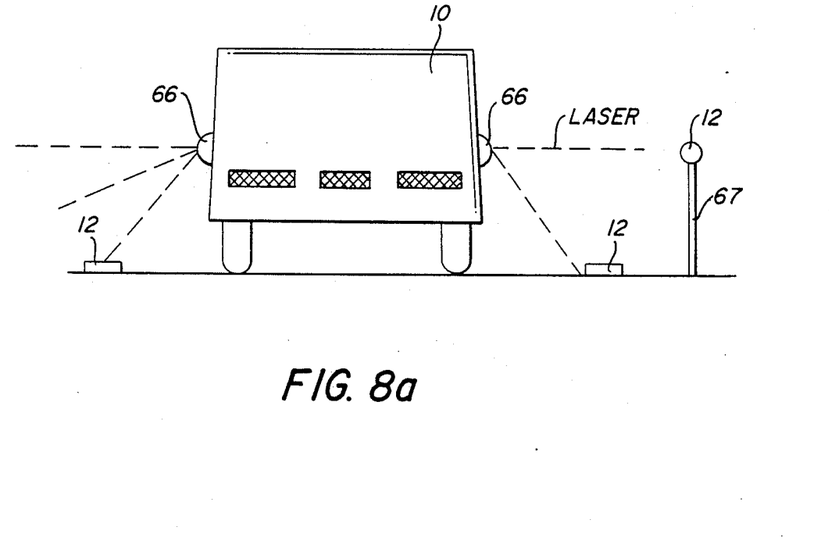
FIG. 8a is a diagrammatic elevational view showing a vehicle having side-oriented scanners.

FIG. 8a shows in an exemplary embodiment a motor vehicle seen from the rear having also side-oriented scanners 66 that may serve to detect proximity to reflectors 12 in the road surface, or mounted on posts 67.

Figure 8B:
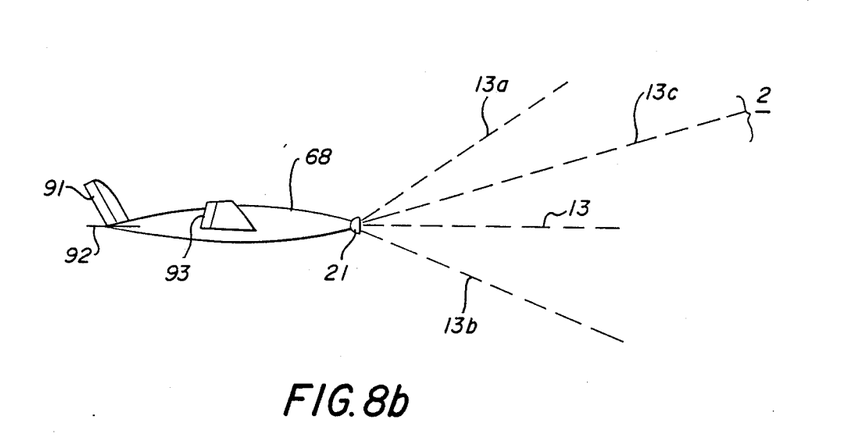
FIG. 8b is a diagrammatic view of an aircraft or space vehicle having a nose-mounted scanner.

FIG. 8b shows an aircraft having a reflector 21 mounted on the nose transmitting pulsed beams 13, 13a, 13b and a beam 13c hitting a target 2 which may be an atmospheric disturbance, another aircraft, or an attacking missile. The major control elements of the aircraft are rudder 91, aileron 93 and elevators 92.

What is claimed:

1. Apparatus for avoiding collision between a moving vehicle and an object moving in a trajectory relative to the vehicle, comprising:
   at least one transmitter mounted on the vehicle for transmitting a scanning beam of pulsed energy, the beam scanning a sector defining at least the space forward of the vehicle;
   at least one receiver connected with said transmitter for receiving any echoes of the pulses from said object;
   a clock for producing timing pulses triggering said transmitter in synchronism with the timing pulses;
   a ranging device having inputs connected to said clock and said receiver for measuring the difference in time between the transmitted pulses and the respective echoes, said difference being proportional to the range to said object;
   scanning means connected to said transmitter for directing the beam to scan said sector;
   a direction device coupled to said scanning means for sensing the instant direction of said beam for the pulse transmitted;
   a computer having inputs connected to said ranging device, said clock, and said direction device for computing for each echo received a set of coordinates of a vector to said object, means for computing the probability of a collision with said object on the basis of the last three sets of said coordinates defining a circle potentially intersecting said trajectory; and
   an anuciator connected to the output of said computer having outputs for announcing the probability of a collision.

2. Apparatus according to claim 1 including a plurality of transmitters and an equal plurality of receivers, each transmitter scanning a respective sector.

3. Apparatus according to claim 1 wherein said transmitter includes a microwave generator, a pulse generator having an output connected to the microwave generator for forming said pulsed energy, said pulse generator having an input being connected to the output of said clock.

4. Apparatus according to claim 3, wherein said scanning means include a rotating motor; a microwave antenna pivotally attached to said vehicle, and scanning linkage connected between said motor and said antenna for setting the antenna in scanning motion; said microwave antenna being connected to the output of said microwave generator and the input of said receiver.

5. Apparatus according to claim 4 including a potentiometer having an arm connected to said scanning linkage and a potentiometer contact connected to the input of said direction device, and an analog-to-digital converter connected to the output of the direction device for generating a digital direction output connected to one of said computer inputs.

6. Apparatus according to claim 1 wherein said computer includes a memory, an algorithm for computing said vector coordinates stored in the memory, and a plurality of dedicated vector coordinate files, stored in said memory.

7. Apparatus according to claim 6, including a memory for storing an algorithm for computing evasive action parameters, an algorithm for computing an anunciator message and a control program; a central processing unit connected to said memory; and interfaces for said clock, said ranging device, said direction device, and a vehicle control interface connected to said central processing unit.

8. Apparatus according to claim 7 including motion control elements in said vehicle coupled to said vehicle control interface controlling the vehicle's motion in response to said evasive action parameters.

9. Apparatus according to claim 8 including a loud speaker connected to said anunciator for announcing the probability of a collision, and for speaking messages in response to said message computing algorithm.

10. Apparatus according to claim 8 including a display connected to said anunciator for displaying the probability of a collision and for displaying messages in response to said message computing algorithm.

11. Apparatus according to claim 8 wherein said vehicle motion control elements include brakes, steering and accelerator.

12. Apparatus according to claim 8 wherein said vehicle motion control elements include ailerons, rudder and elevator.

* * * * *